US012607050B2

(12) United States Patent
Iwasaki

(10) Patent No.: US 12,607,050 B2
(45) Date of Patent: Apr. 21, 2026

(54) ENDOSCOPE AND METHOD FOR LOCKING KNOB

(71) Applicant: OLYMPUS MEDICAL SYSTEMS CORP., Tokyo (JP)

(72) Inventor: Seiji Iwasaki, Hachioji (JP)

(73) Assignee: Olympus Medical Systems Corp., Tokyo (JP)

( * ) Notice: Subject to any disclaimer, the term of this patent is extended or adjusted under 35 U.S.C. 154(b) by 546 days.

(21) Appl. No.: 17/981,559

(22) Filed: Nov. 7, 2022

(65) Prior Publication Data

US 2023/0151653 A1 May 18, 2023

Related U.S. Application Data

(60) Provisional application No. 63/279,887, filed on Nov. 16, 2021.

(51) Int. Cl.
*E05C 9/04* (2006.01)
*E05C 21/00* (2006.01)

(52) U.S. Cl.
CPC .............. *E05C 9/043* (2013.01); *E05C 21/00* (2013.01)

(58) Field of Classification Search
CPC . A61B 1/0052; A61B 1/0051; A61B 1/00066; A61B 1/00078; A61M 25/0136
See application file for complete search history.

(56) References Cited

U.S. PATENT DOCUMENTS

| | | | | |
|---|---|---|---|---|
| 8,011,067 | B2 * | 9/2011 | Thompson | A61B 1/0052 16/441 |
| 2009/0124398 | A1 | 5/2009 | Thompson | |
| 2021/0353132 | A1 * | 11/2021 | Gorringe | A61B 1/0052 |
| 2021/0361149 | A1 * | 11/2021 | Sigmon, Jr. | A61B 1/00128 |

FOREIGN PATENT DOCUMENTS

| | | | |
|---|---|---|---|
| CN | 103654695 | A | 3/2014 |
| CN | 104545770 | A | 4/2015 |
| CN | 109106317 | A | 1/2019 |
| JP | 2010-220800 | A | 10/2010 |
| JP | 2011-030866 | A | 2/2011 |
| JP | 2021-137183 | A | 9/2021 |

OTHER PUBLICATIONS

Office Action dated Jun. 18, 2025, issued in corresponding Chinese Patent Application No. 202211382874.9.

* cited by examiner

*Primary Examiner* — Alexandra L Newton
(74) *Attorney, Agent, or Firm* — Morgan, Lewis & Bockius LLP

(57) ABSTRACT

An endoscope comprises an insertion portion, an operation portion body provided at a proximal end side of the insertion portion, a knob provided in the operation portion body, the knob configured to rotate around a rotation shaft, and a turn locking mechanism provided in the knob. The turn locking mechanism includes a lock button reversibly translatable from a first position to a second position, a lock bar connected to the lock button, the lock bar extending from an inside surface of the lock button, and a fixed member attached to the operation portion body. When the lock button is in the second position, the lock bar engages the fixed member to prevent the knob from rotating around the rotation shaft.

19 Claims, 16 Drawing Sheets

ENDOSCOPE AND METHOD FOR LOCKING KNOB

RELATED APPLICATION DATA

This application is based on and claims priority under 35 U.S.C. § 119 to U.S. Provisional Application No. 63/279,887 filed on Nov. 16, 2021, the entire contents of which are incorporated herein by reference.

FIELD OF THE DISCLOSURE

The present disclosure relates to an endoscope including a knob configured to operate an active member and a method for locking the knob configured to operate the active member of the endoscope.

BACKGROUND

Conventionally, as an endoscope, there is known a configuration in which a bending portion is provided at a distal end portion of an insertion portion. The bending portion is operated to bend in two directions around an axis of the insertion portion or over an entire circumference combining four directions of up, down, left, and right, by a user operating and turning a bending operation knob provided at an operation portion of the endoscope.

For example, Japanese Patent Application Laid-Open Publication No. 2011-30866 discloses a technique of an endoscope that enables an operation of angle lock with only one hand by integrating a lock button with an angle knob that is a bending operation knob.

The conventional endoscope is configured such that when the lock button is pushed in, a lock ring moves, a top surface of a friction plate and a bottom surface of a top plate abut on each other to generate a frictional force between the top surface and the bottom surface, and thereby the angle knob that is a bending operation knob is locked.

SUMMARY OF THE DISCLOSURE

An endoscope comprises an insertion portion, an operation portion body provided at a proximal end side of the insertion portion, a knob provided in the operation portion body, the knob configured to rotate around a rotation shaft, and a turn locking mechanism provided in the knob. The turn locking mechanism includes a lock button reversibly translatable from a first position to a second position, a lock bar connected to the lock button, the lock bar extending from an inside surface of the lock button, and a fixed member attached to the operation portion body. When the lock button is in the second position, the lock bar engages the fixed member to prevent the knob from rotating around the rotation shaft.

BRIEF DESCRIPTION OF THE DRAWINGS

FIG. 7 is a cross-sectional view showing a configuration of the UD bending operation knob in a state in which a lock button of the turning lock mechanism is pushed in.

FIG. 8 is a cross-sectional view showing a configuration of the UD bending operation knob in a state in which a release button of a lock release mechanism is pushed in.

FIG. 13 is a cross-sectional view showing a configuration of the UD bending operation knob in a state in which a lock button of the turning lock mechanism of the first modification is pushed in.

FIG. 16 is a partial cross-sectional view showing the operation portion body at which the bending operation knob in a state in which a lock button of a turning lock mechanism of the second modification is pushed in.

FIG. 23 is a cross-sectional view showing a configuration of the UD bending operation knob in which a lock button of the turning lock mechanism of the third modification is pushed in.

DETAILED DESCRIPTION

Generally, in a bending operation knob configured to operate and bend a bending portion or the like of an endoscope, a large holding force can be applied and therefore it is difficult to fix a turning position reliably with one hand of a user, in order to fix a bending state of the bending portion. In a conventional structure that fixes a bending operation knob, fixation of the bending operation knob may come off unintentionally by a user.

According to an embodiment of the present disclosure, it is possible to provide an endoscope and a method for locking a knob that operates an active member of the endoscope that can easily perform fixation of a turning position of the knob configured to operate an active member such as a bending portion with one hand, and reliably fix the knob. The method comprises translating the lock button from the first position to the second position; and engaging the lock bar with the fixed member to prevent the knob from rotating around the rotation shaft. The engaging the lock bar with the fixed member can be the lock bar abutting on the surface.

Here, an endoscope that is the present disclosure is described by being cited as an example. Note that in the following explanation, the drawings based on each embodiment are schematic, attention should be paid to the fact that the relationship between the thickness and the width of each part, ratios of the thicknesses of respective parts and the like are different from the actual relationship and ratios, and there may be parts where the relationships and ratios of mutual dimensions are different among the drawings.

As an endoscope in the following configuration explanation, there is illustrated an endoscope for a digestive system an insertion portion of which has flexibility to be inserted into a digestive system in an upper part or a lower part of a living body, but the endoscope is not limited to this, and can also be applied to various so-called flexible endoscopes, and a so-called rigid endoscope with a rigid insertion portion that is used for surgery.

Hereinafter, an endoscope of one aspect of the present disclosure is described based on the drawings.

Figure 1:
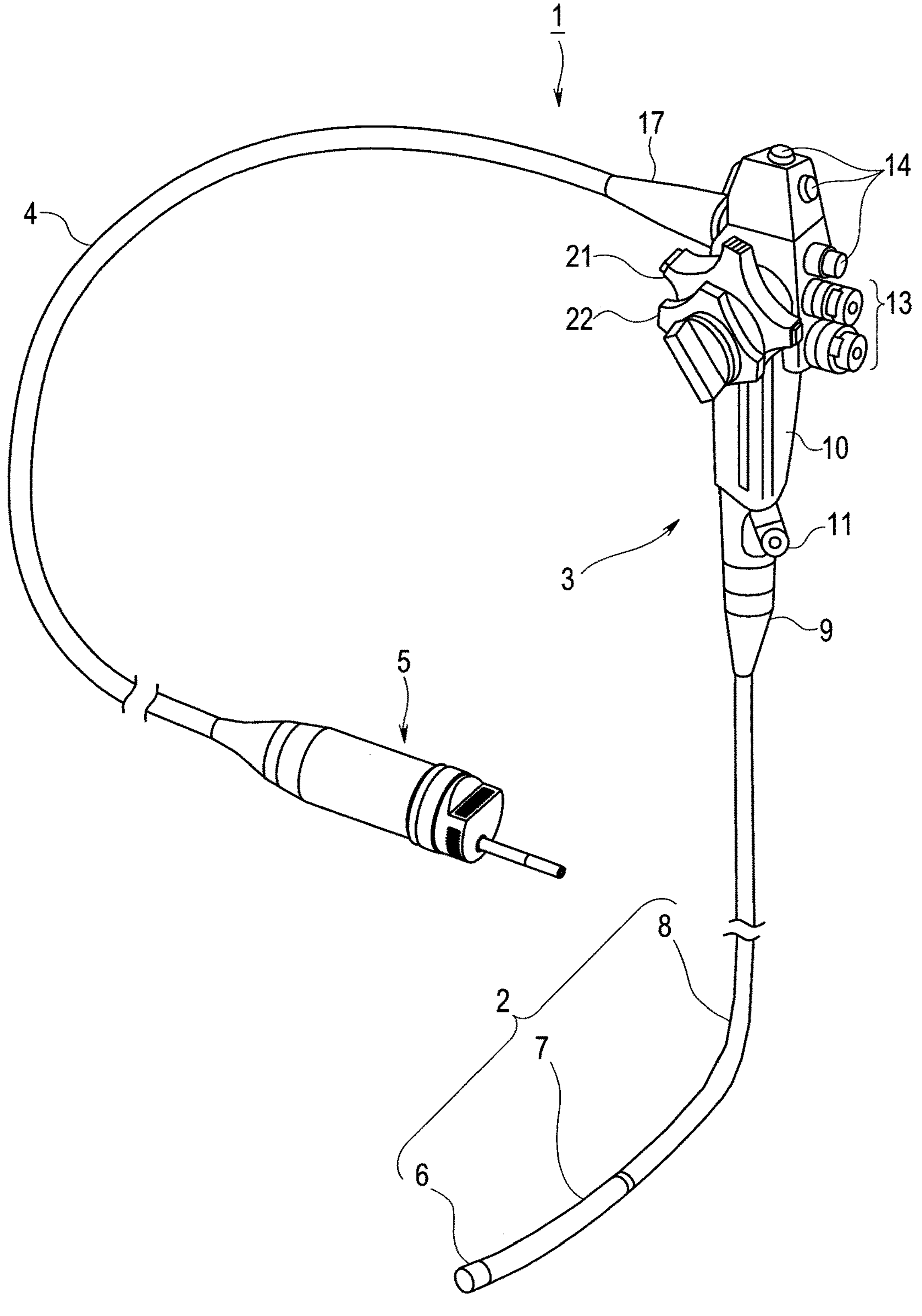
FIG. 1 is a perspective view showing an external appearance of an endoscope according to one aspect of the present disclosure.

As shown in FIG. 1, an endoscope 1 that is an insertion apparatus is configured by mainly having an insertion portion 2, an operation portion 3, a universal cord 4, and an endoscope connector 5.

The insertion portion 2 is an elongated hollow long member configured to be inserted into an observation target site. The operation portion 3 is provided connectively to a proximal end portion of the insertion portion 2. The universal cord 4 is provided to extend from a bend preventing portion 17 provided at a side surface of the operation portion 3. The endoscope connector 5 is provided at an extension end portion of the universal cord 4.

The insertion portion 2 has a distal end portion 6, a bending portion 7 as an active member, and a flexible tube portion 8. The distal end portion 6 is a rigid member to be a distal end configuring portion. The bending portion 7 is a movable portion that is bendable and provided connectively to a rear portion of the distal end portion 6. The flexible tube portion 8 is formed by a soft and tubular member at a rear portion of the bending portion 7, is long and has flexibility.

In the distal end portion 6, an observation optical system, an illumination optical system, an air-feeding and water-feeding nozzles, and a suction opening not illustrated are provided. Note that illumination light that is emitted to a subject from the illumination optical system here is radiated from a light source of an external apparatus not illustrated to which the endoscope connector 5 is connected, and is transmitted to the distal end portion 6 via a light guide bundle placed in the insertion portion 2. Note that the light source may be an LED or the like contained in the operation portion 3.

The operation portion 3 is configured by having an operation portion body 10 configuring an operation grasping portion, a bend preventing portion 9 that is connected to a proximal end side of the flexible tube portion 8 of the insertion portion 2, and a treatment instrument insertion opening 11 that is placed in a vicinity of the bend preventing portion 9 and to be an opening portion of an insertion channel not illustrated in the insertion portion 2.

Figure 2:
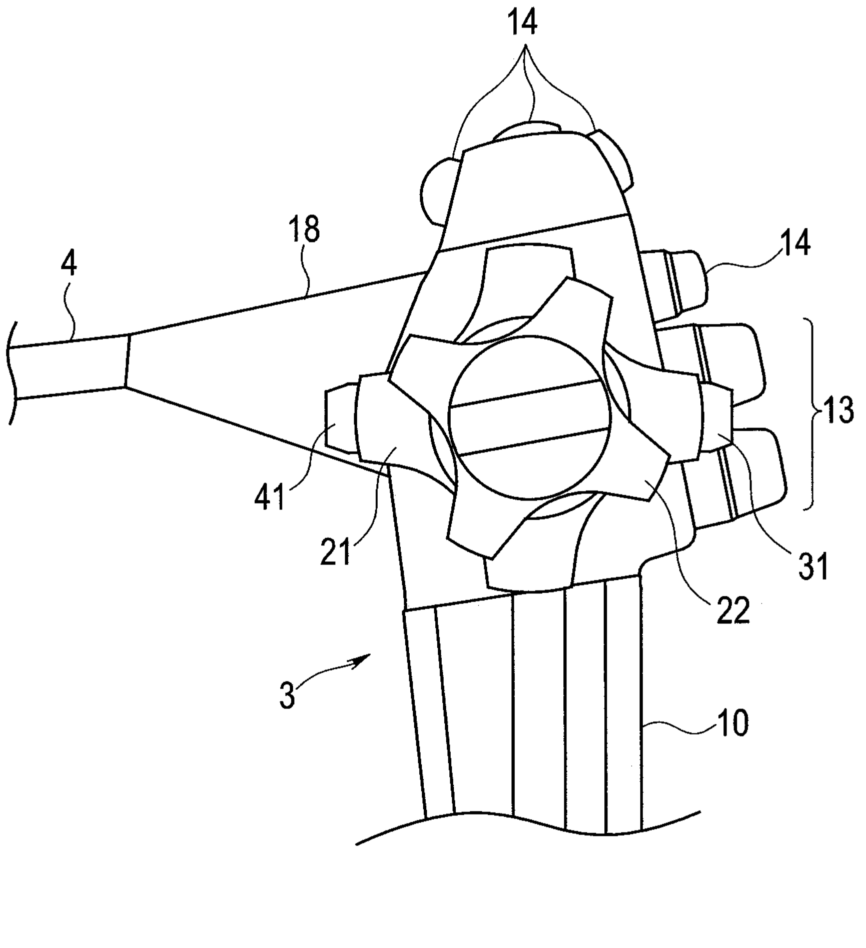
FIG. 2 is a perspective view partially showing an operation portion.

In the operation portion body 10, two bending operation knobs 21 and 22 for operating and bending the bending portion 7 of the insertion portion 2 are turnably placed as shown in FIG. 2. In the operation portion body 10, buttons 13 for mainly performing suction, air feeding and water feeding, switches 14 configured to perform various endoscope functions, mainly an operation of an image pickup system and the like are provided (see FIG. 1). The two bending operation knobs 21 and 22 are provided in the operation portion body 10, and the two bending operation knobs 21 and 22 are configured to rotate around a rotation shaft 27.

Note that the bending operation knobs 21 and 22 are configured by a UD bending operation knob 21 for operating and bending the bending portion 7 in an up-down direction, and an RL bending operation knob 22 for operating and bending the bending portion 7 in a left-right direction. The UD bending operation knob 21 and the RL bending operation knob 22 are placed by being superimposed on a same axis to be a rotation axis (see FIG. 2).

The endoscope connector 5 is configured to be electrically connected to external apparatuses such as a video processor and a light source apparatus not illustrated removably.

Here, detailed configurations of the UD bending operation knob 21 and the RL bending operation knob 22 that operate and bend the bending portion 7 that is an active member provided at the insertion portion 2 of the endoscope 1 are described below.

Figure 3:
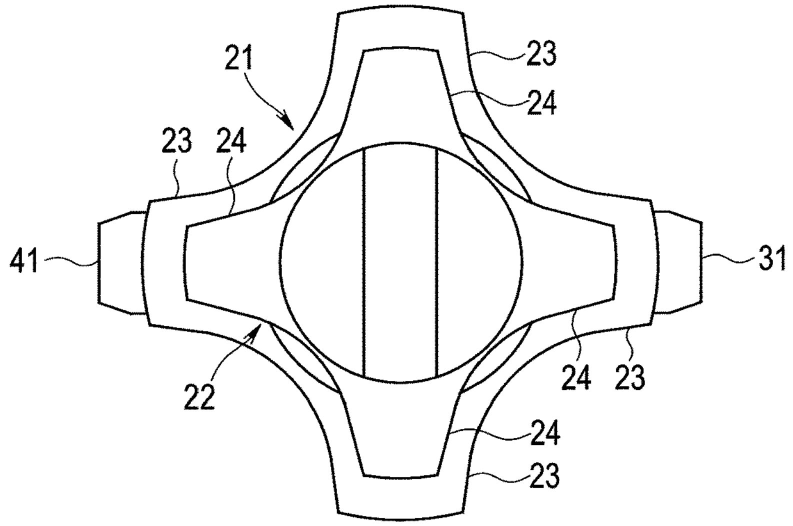
FIG. 3 is a plan view showing a configuration of a bending operation knob.

As shown in FIG. 3, the two UD bending operation knob 21 and RL bending operation knob 22 are both disk-shaped members including four finger rest portions 23 and 24 extending at positions that are turned 90° circumferentially. Note that the numbers of finger rest portions 23 and 24 are not limited as long as the numbers are plural.

Figure 4:
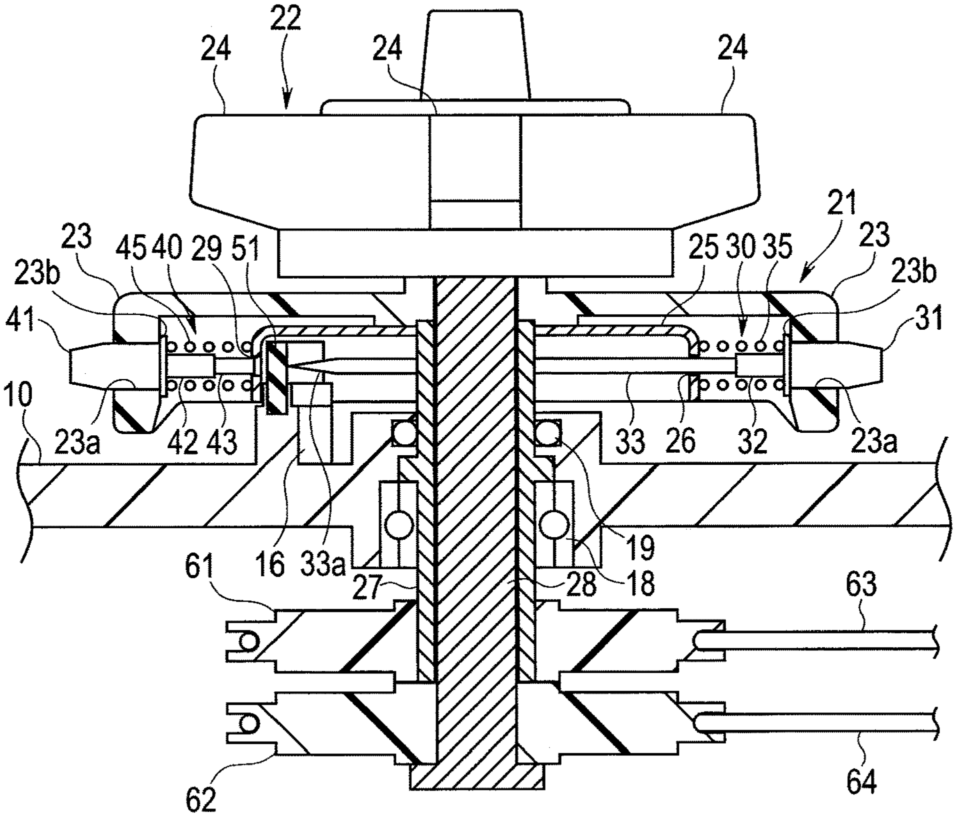
FIG. 4 is a partial cross-sectional view showing a configuration of an operation portion body at which the bending operation knob is provided.

As shown in FIG. 4, a cylindrical rotation shaft 27 is connected to the UD bending operation knob 21. The rotation shaft 27 is fixed to a bearing 18 provided in the operation portion body 10 and is turnably held. Note that in the operation portion body 10, an O-shaped ring 19 that is in contact with the rotation shaft 27 to hold the rotation shaft 27 in a watertight manner is provided.

The rotation shaft 27 is provided with a pulley 61 at an end portion inside of the operation portion 3. On the pulley 61, a UD bending operation wire 63 is placed. The UD bending operation wire 63 is inserted through an inside of the insertion portion 2, and is connected to a bending tube such as a bending piece not illustrated and provided in the bending portion 7.

When the UD bending operation knob 21 is operated to turn, the pulley 61 also turns, and the UD bending operation wire 63 is pulled or loosened. Thereby, the bending tube such as a bending piece in the bending portion 7 turns in an up-down direction, and thereby the bending portion 7 is bent up and down.

Note that at the UD bending operation knob 21, a lock button 31 of a turn locking mechanism 30 is placed at one finger rest portion 23 of the four finger rest portions 23, and a release button 41 of a lock release mechanism 40 is placed at one finger rest portion 23 on which the lock button 31 is not provided among the four finger rest portions 23. Detailed configuration explanation of the turn locking mechanism 30 and the lock release mechanism 40 is described later.

The UD bending operation knob 21 is provided with an annular member 25 in a circular recessed portion 21*a*. The annular member 25 has a plurality of hole portions 26 and 29 formed in a side peripheral portion, and is connected to the rotation shaft 27.

A rod-shaped rotation shaft 28 is connected to the RL bending operation knob 22. The rotation shaft 28 is inserted through an inside of the rotation shaft 27 of the UD bending operation knob 21 and is turnably held.

The rotation shaft 28 is provided with a pulley 62 at an end portion inside of the operation portion 3. On the pulley 62, an RL bending operation wire 64 is placed. The RL bending operation wire 64 is also inserted through the inside of the insertion portion 2 and is connected to a bending tube such as a bending piece not illustrated and provided in the bending portion 7.

When the RL bending operation knob 22 is operated to turn, the pulley 62 also turns, and the RL bending operation wire 64 is pulled or loosened. Thereby, the bending tube such as the bending piece in the bending portion 7 turns in a left-right direction, and thereby the bending portion 7 is bent left and right.

A bending mechanism that can actively move the bending portion 7 up, down, left and right (UD-RL) described above is well-known, and therefore, explanation concerning the other components is omitted.

Here, detailed configurations of the turn locking mechanism 30 and the lock release mechanism 40 that are provided in the UD bending operation knob 21 are described below.

Figure 5:
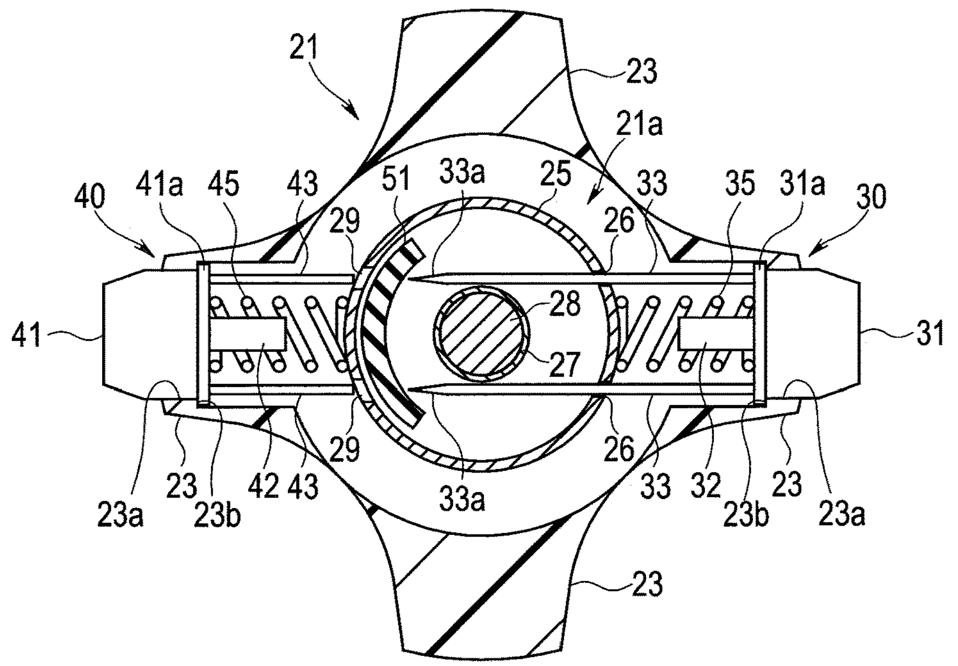
FIG. 5 is a cross-sectional view showing a configuration of a UD bending operation knob in which a turning lock mechanism and a lock release mechanism are provided.

The turn locking mechanism 30 has the lock button 31, lock bars 33, a coil spring 35, and a fixed member 51, as shown in FIG. 4 and FIG. 5. The lock button 31 is reversibly translatable from a first position to a second position, a lock bar 33 is connected to the lock button 31, the lock 33 bar extends from an inside surface of the lock button 31, and a fixed member 51 is attached to the operation portion body 10. When the lock button 31 is in the second position, the lock bar 33 engages the fixed member 51 to prevent the bending operation knob 21 from rotating around the rotation shaft 27. The lock bar 33 is a first lock bar 33 and the turn locking mechanism includes a second lock bar 33, the first lock bar 33 is separated from the second lock bar 33 with the rotation shaft 27 interposed therebetween, and when the lock button 31 is in the second position, at least one of the first lock bar 33 and the second lock bar 33 engages with or penetrates completely or penetrates partially the fixed member 51 to prevent the bending operation knob 21 from rotating around the rotation shaft 27.

In the lock button 31, a rod-shaped projection 32 that is inserted through the coil spring 35 is provided to extend in a center direction of the UD bending operation knob 21. The lock button 31 is provided at one of the finger rest portions 23 of the UD bending operation knob 21. The lock button 31 is provided to be able to protrude and retract in directions of a center and an outer periphery of the UD bending operation knob 21.

Note that in the finger rest portion 23 at which the lock button 31 is provided, a button accommodation portion 23*a* that is a hole portion formed in a thick-walled portion of an end portion is formed, and the lock button 31 is movably fitted in the button accommodation portion 23*a*.

In the lock button 31, a flange 31*a* is formed. The flange 31*a* abuts on an abutment surface 23*b* which serves as a wall portion of the recessed portion 21*a* of the UD bending operation knob 21, to thereby prevent the lock button 31 from slipping off from the button accommodation portion 23*a*.

The lock bar 33 has a sharp pointed end portion 33*a* at a distal end, and two lock bars 33 are provided here. Each of the two lock bars 33 has one end connected to the lock button 31. The two lock bars 33 extend from the end surface of the lock button 31 and are disposed parallel with the rotation shaft 27 being interposed between the two lock bars 33. The fixed member 51 includes an elastic material. When the lock button 31 is in the second position and the lock bar 33 engages the fixed member 51, the pointed end portion 33*a* pierces a surface of the elastic material.

Note that the two lock bars 33 are formed of a rigid metal or the like, and inserted through the respective hole portions 26 of the annular member 25.

The coil spring 35 that is an urging member is provided between the lock button 31 and the annular member 25. The coil spring 35 is disposed to abut on the end surface of the lock button 31 and an outer peripheral surface of the annular member 25 and urges the lock button 31 outward.

The fixed member 51 is formed of an elastic body such as rubber, and is an arc-shaped block body. The fixed member 51 is fixed to a seat 16 formed to project on an outer surface side of the operation portion body 10 so as to protrude inside of the annular member 25 of the recessed portion 21*a* of the UD bending operation knob 21.

The lock release mechanism 40 has the release button 41, release bars 43, and a coil spring 45. The lock release mechanism 40 is provided in the bending operation knob 21.

In the release button 41, a rod-shaped projection 42 that is inserted through the coil spring 45 is provided to extend in the center direction of the UD bending operation knob 21. The release button 41 is provided at one of the finger rest portions 23, located at a symmetrical position at an opposite side to the finger rest portion 23 at which the lock button 31 of the turn locking mechanism 30 is provided. The release button 41 is also provided to be able to protrude and retract in the directions of the center and the outer periphery of the UD bending operation knob 21.

Note that in the finger rest portion 23 at which the release button 41 is provided, the button accommodation portion 23*a* that is a hole portion formed in a thick-walled portion at an end portion is also formed, and the release button 41 is movably fitted into the button accommodation portion 23*a*.

Further, also at the release button 41, a flange 41*a* is formed. The flange 41*a* abuts on an abutment surface 23*b* which serves as the wall portion of the recessed portion 21*a* of the UD bending operation knob 21, to thereby prevent the release button 41 from slipping off from the button accommodation portion 23*a*. The release button 41 is reversibly translatable from a third position to a fourth position.

Two release bars 43 are provided here. One end of each of the two release bars 43 is connected to the release button 41. The two release bars 43 extend from an end surface of the release button 41, and an extension end of each of the release bars 43 is disposed parallel to face one of the two lock bars 33. The release bar 43 is connected to the release button 41, the release bar 43 extends from an inside surface of the release button 41 and having an end portion, the end portion of the release bar 43 faces an end portion of the lock bar 33. The reversible translation of the lock button from the first position to the second position is along a first axis, the reversible translation of the release button from the first position to the second position is along a second axis, and the first axis and the second axis are coaxial.

Note that the two release bars 43 are formed of a rigid metal, a synthetic resin or the like. In the annular member 25, the hole portions 29 through which the release bars 43 can be inserted are formed on respective extension lines on which the two release bars 43 extend.

The coil spring 45 that is an urging member is also provided between the release button 41 and the annular member 25. The coil spring 45 is disposed to abut on the end surface of the release button 41 and an outer peripheral surface of the annular member 25, and urges the release button 41 outward.

Operations of a state of locking (fixing) a turning position of the UD bending operation knob 21, and a state of releasing locking (fixing), by the turn locking mechanism 30 and the lock release mechanism 40 configured as above are described in detail below.

Figure 6:
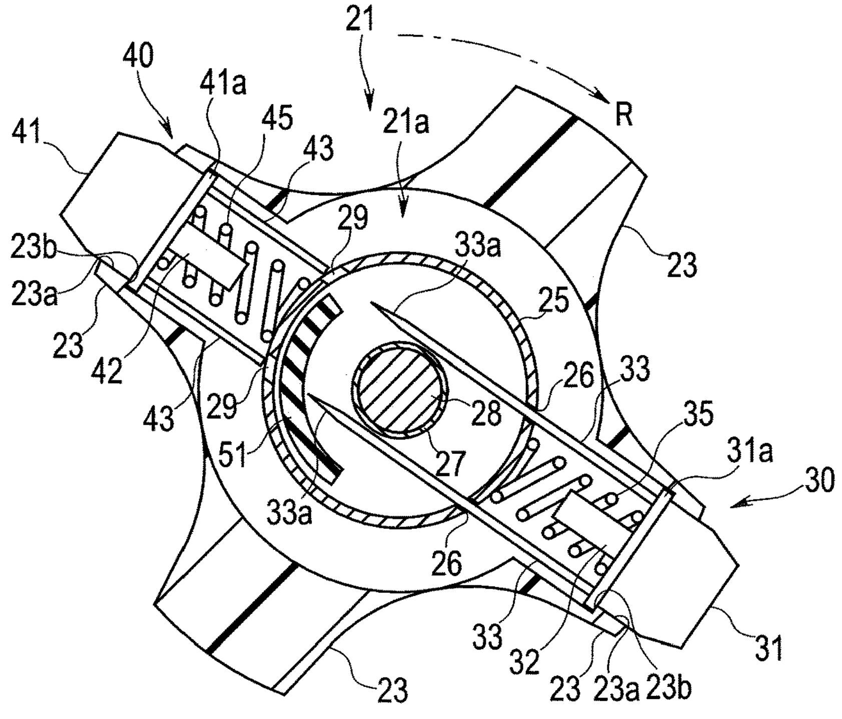
FIG. 6 is a cross-sectional view showing a configuration of the UD bending operation knob that is turned to a predetermined angle.

A user operates and turns the UD bending operation knob 21 around the rotation shaft 27 as shown in FIG. 5 and FIG. 6, when operating and bending the bending portion 7 that is an active member provided at the insertion portion 2 of the endoscope 1 in the up-down direction here. Note that here, a state in which the UD bending operation knob 21 is operated to turn to a predetermined angle in a right-hand (clockwise shown by an arrow) direction as seen toward the paper surface of the drawing is illustrated here.

Figure 7:
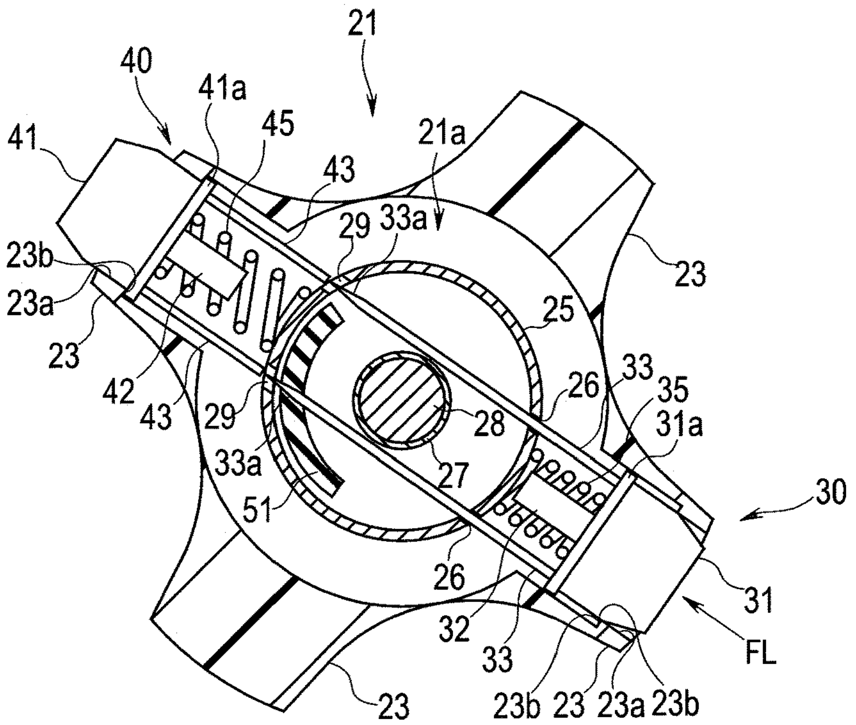

When the user desires to maintain (fix) a state in which the bending portion 7 is desirably bent, the user pushes in the lock button 31 of the turn locking mechanism 30, which is provided at one of the finger rest portions 23 as shown in FIG. 7, in order to lock (fix) the turning position of the UD bending operation knob 21.

At this time, the lock button 31 is pushed in in an arrow FL direction, and thereby slidingly moves to the center side of the UD bending operation knob 21 against a biasing force of the coil spring 35. In association with this, the two lock bars 33 provided to extend from the lock button 31 also move to the center side of the UD bending operation knob 21.

Here, the pointed end portion 33*a* of one of the two lock bars 33 is pierced to penetrate through the fixed member 51. In other words, since the pointed end portion 33*a* of the lock bar 33 abuts on the fixed member 51 through which the pointed end portion 33*a* penetrates by piercing to a direction in which the UD bending operation knob 21 turns, the turning position of the UD bending operation knob 21 is locked. Thereby, the turning position of the UD bending operation knob 21 is locked. Then, the fixed member 51 extends 90° in a circumferential direction of the rotation shaft 27, the fixed member 51 extends to include other angles that have the same effect as 90°.

Note that a frictional resistance force when the pointed end portion 33*a* pierces the fixed member 51 is set to be larger than a repulsive force by the coil spring 35 that urges the lock button 31, and to be able to continue to lock the turning position of the UD bending operation knob 21.

Figure 8:
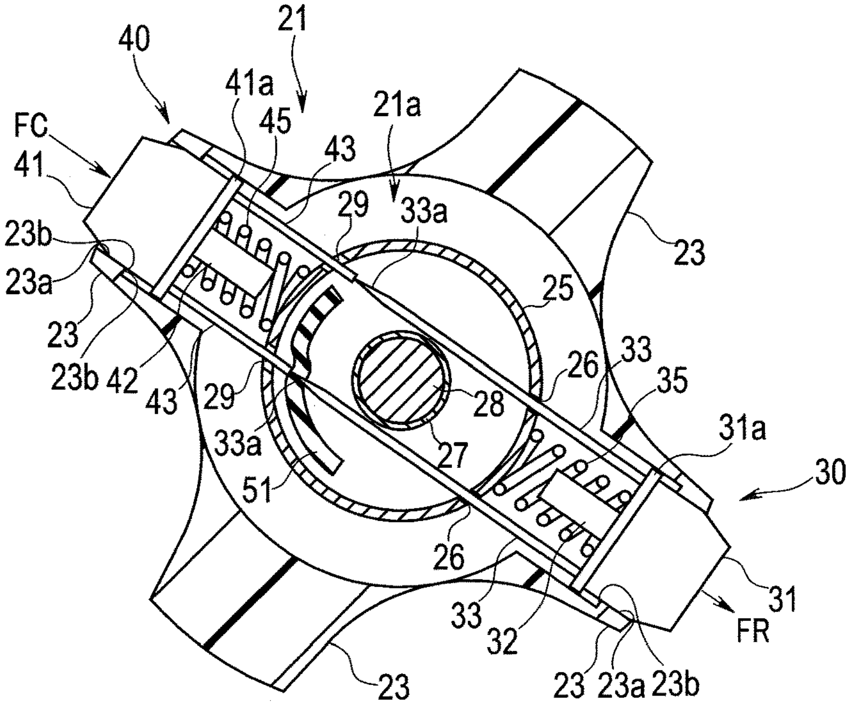

When the user desires to release fixation of the turning position of the UD bending operation knob 21, the user pushes in the release button 41 of the lock release mechanism 40, which is provided at an opposite side of the finger rest portion 23, as shown in FIG. 8.

At this time, the release button 41 is pushed in in an arrow FC direction, and thereby slidingly moves to the center side of the UD bending operation knob 21 against a biasing force of the coil spring 45. In association with this, the two release bars 43 provided to extend from the release button 41 also move to the center side of the UD bending operation knob 21.

The two release bars 43 are inserted through the respective hole portions 29 of the annular member 25. At this time, extension ends of the two release bars 43 abut on the respective pointed end portions 33*a* of the two lock bars 33, and push in the pointed end portions 33*a* in a direction in which the two release bars 43 move.

Thereby, the lock bar 33 that pierces the fixed member 51 removes from the fixed member 51, and locking of the UD bending operation knob 21 is released. At this time, the lock button 31 and the two lock bars 33 of the turn locking mechanism 30 move in an arrow FR direction that is an outer periphery direction of the UD bending operation knob 21 by the biasing force of the coil spring 35. Thereby, the UD bending operation knob 21 is brought into a state in which the UD bending operation knob 21 can perform a free turning operation without being fixed by the turn locking mechanism 30.

As described above, the endoscope 1 of the present embodiment is configured such that the turn locking mechanism 30 configured to fix the turning position of the UD bending operation knob 21 and the lock release mechanism 40 are provided in the UD bending operation knob 21 configured to operate and bend the bending portion 7 that is an active member provided at the insertion portion 2, and thereby the user can easily operate lock and release of the UD bending operation knob 21 with one hand.

The user can easily lock the turning position of the UD bending operation knob 21 by only pushing in the lock button 31 of the turn locking mechanism 30 with a finger of one hand that operates the UD bending operation knob 21 when fixing the bending portion 7 in a bending state. Therefore, the user can fix the bending portion 7 in the bending state without continuing to hold the turning position of the UD bending operation knob 21.

Further, the user can easily release locking of the UD bending operation knob 21 by only pushing in the release button 41 of the lock release mechanism 40 with a finger of one hand that operates the UD bending operation knob 21 when releasing the bending portion 7 that is fixed in a bending state.

Note that fixation of the UD bending operation knob 21 is not released as long as the user does not intentionally push in the release button 41 of the lock release mechanism 40, but can reliably hold fixation of the turning position of the UD bending operation knob 21 if the user lightly presses the lock button 31 of the turn locking mechanism 30.

In the above, the configuration in which the turn locking mechanism 30 and the lock release mechanism 40 are provided in only the UD bending operation knob 21 is illustrated, but as a matter of course, the lock button 31 and the release button 41 may be provided at the finger rest portions 24 of the RL bending operation knob 22, and the turn locking mechanism 30 and the lock release mechanism 40 may be provided in the RL bending operation knob 22, without being limited to the above configuration.

From the above, the endoscope 1 of the preset embodiment can be configured such that fixation of the turning positions of the bending operation knobs 21 and 22 that operate the active member such as the bending portion 7 can be easily performed with one hand of the user, and the bending operation knobs can be reliably fixed.

Note that the fixed member 51 is formed of an elastic body such as rubber, is configured to be pierced by the lock bar 33 of the turn locking mechanism 30, and therefore is suitable for the single-use (disposable) endoscope 1.

(First Modification)

A present modification is another aspect of the fixed member of the turn locking mechanism 30. Therefore, for the components already described in the above, the same reference signs are used, and detailed explanation of the components is omitted.

Figure 9:
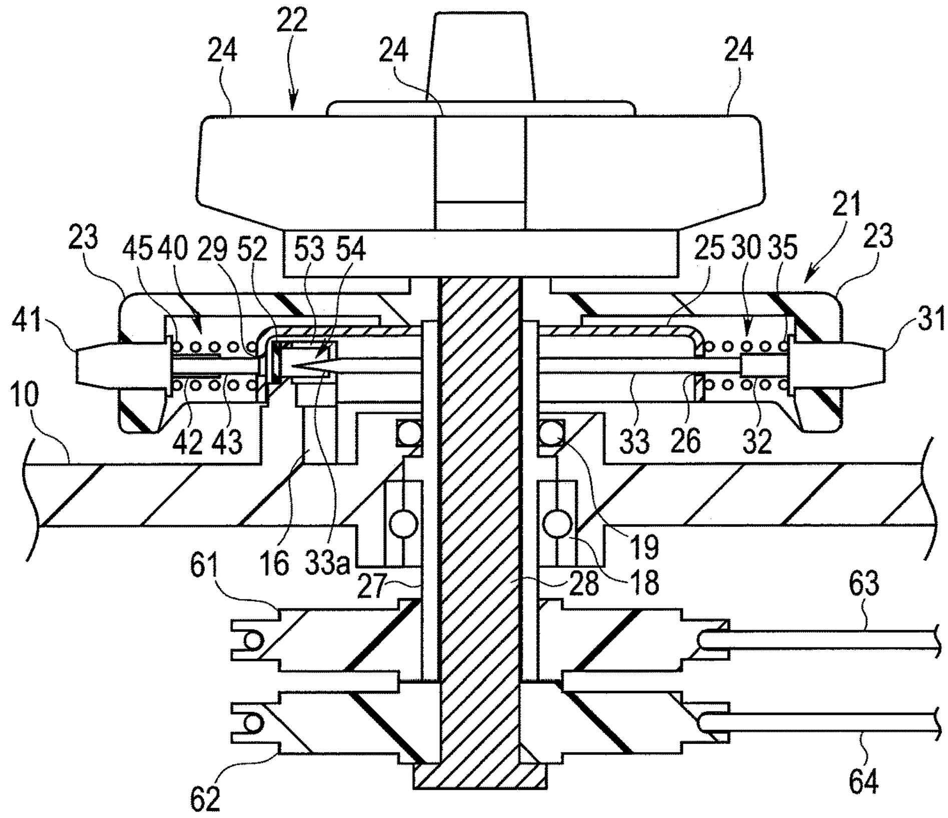
FIG. 9 is a partial cross-sectional view showing an operation portion body at which a bending operation knob of a first modification is provided.
Figure 10:
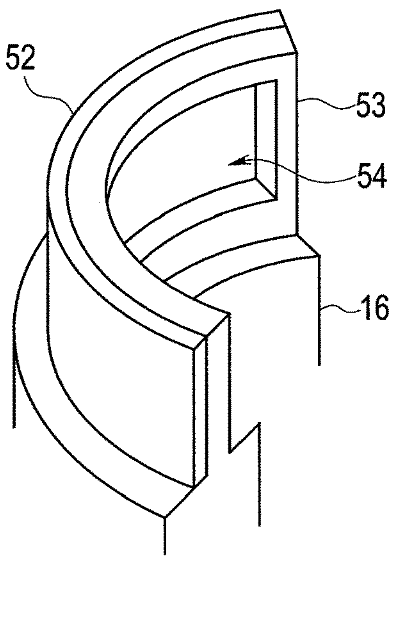
FIG. 10 is a perspective view partially showing a configuration of a fixed member of the first modification.

In an endoscope 1 of the present example, an arc-shaped rigid frame body 53 of metal, resin or the like is provided on a seat 16 that is projectingly formed on an outer surface side of an operation portion body 10, as shown in FIG. 9 and FIG. 10. In the frame body 53, an opening portion 54 is formed. A sheet-shaped fixed member 52 formed of an elastic body such as rubber is provided to close the opening portion 54 of the frame body 53.

The sheet-shaped fixed member 52 and rigid frame body 53 are included in a turn locking mechanism 30.

Operations in a state of locking (fixing) the turning position of a UD bending operation knob 21 and in a state of releasing locking (fixing) by the turn locking mechanism 30 and a lock release mechanism 40 of the present modification configured like this are described. Note that the same operation content as the aforementioned operation content is omitted or briefly described.

Figure 11:
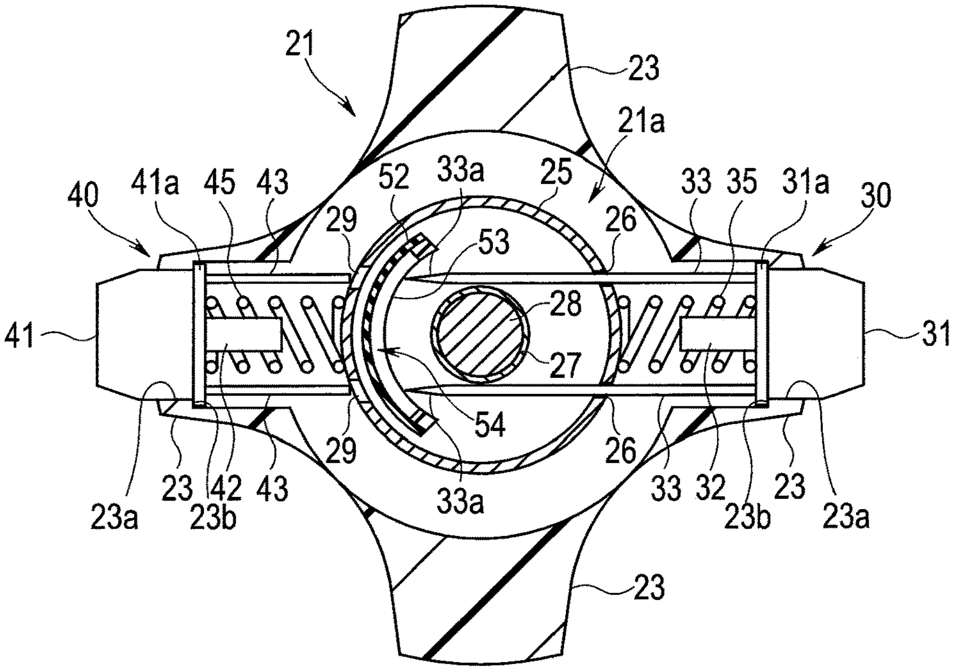
FIG. 11 is a cross-sectional view showing a configuration of a UD bending operation knob in which a turning lock mechanism of the first modification and a lock release mechanism are provided.
Figure 12:
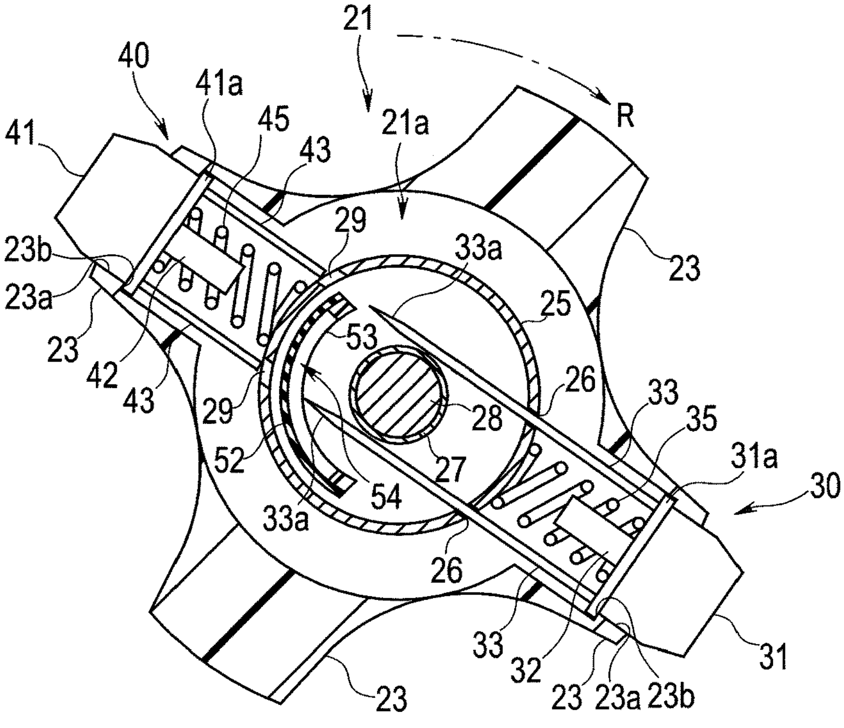
FIG. 12 is a cross-sectional view showing a configuration of the UD bending operation knob that is turned to a predetermined angle of the first modification.

When the user also operates and bends a bending portion 7 that is an active member provided at an insertion portion 2 of the endoscope 1 in an up-down direction here, the user operates and turns the UD bending operation knob 21 around a rotation shaft 27 as shown in FIG. 11 and FIG. 12.

Figure 13:
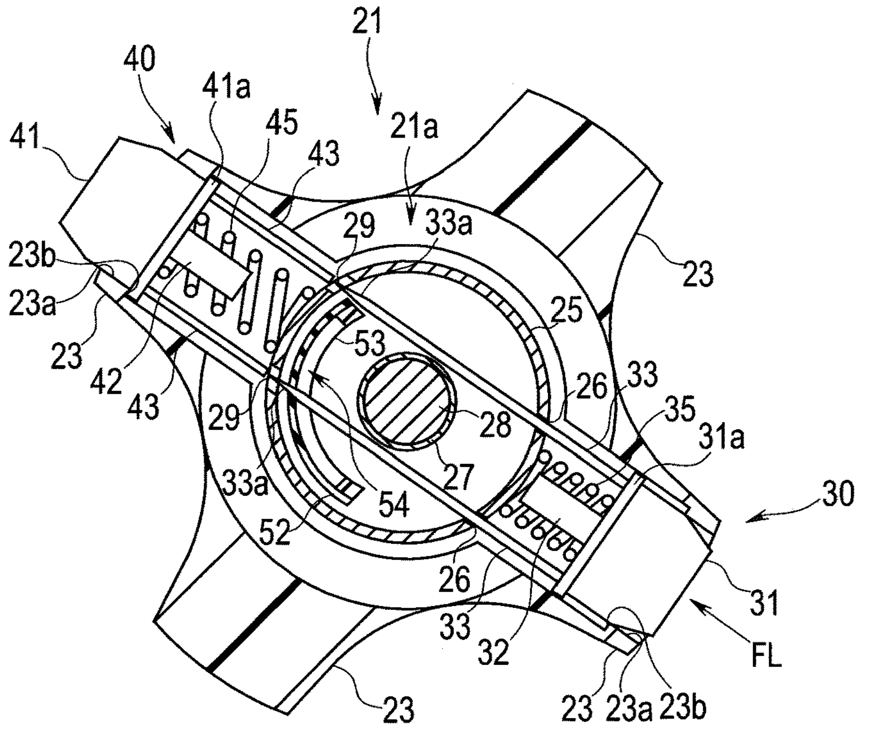

When the user desires to maintain (fix) a state in which the bending portion 7 is desirably bent, the user can lock (fix) the turning position of the UD bending operation knob 21 by pushing in the lock button 31 of the turn locking mechanism 30 in an arrow FL direction as shown in FIG. 13.

Here, one pointed end portion 33*a* of two lock bars 33 pierces so as to penetrate through the fixed member 52. Note that in the lock bar 33, the pointed end portion 33*a* passes through the frame body 53 by the opening portion 54 of the frame body 53 to pierce and penetrate through the fixed member 52. In other words, the pointed end portion 33*a* pierces the fixed member 52 without hitting the frame body 53. An elastic material can cover the opening portion 54.

Since the pointed end portion 33*a* of the lock bar 33 abuts on the pierced fixed member 52 to a direction in which the UD bending operation knob 21 turns, the turning position of the UD bending operation knob 21 is locked. Thereby, the turning position of the UD bending operation knob 21 is locked.

Note that a frictional resistance force when the pointed end portion 33*a* pierces the fixed member 52 is set to be larger than a repulsive force by a coil spring 35 that urges the lock button 31, and to be able to continue to lock the turning position of the UD bending operation knob 21.

Figure 14:
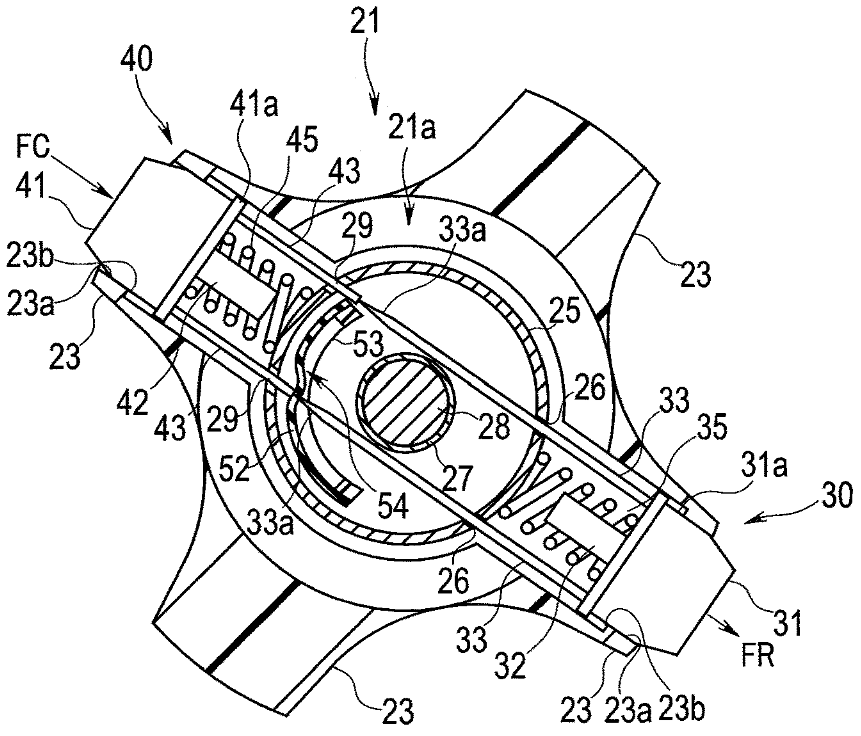
FIG. 14 is a cross-sectional view showing a configuration of the UD bending operation knob in a state in which a release button of the lock release mechanism is pushed in of the first modification.

When the user desires to release fixation of the turning position of the UD bending operation knob 21, the user pushes in a release button 41 of the lock release mechanism 40 that is provided at an opposite side of the finger rest portion 23 as shown in FIG. 14.

As the release button 41 is pushed in in an arrow FC direction, two release bars 43 are inserted through the respective hole portions 29 of an annular member 25, and push in the two lock bars 33.

Thereby, the lock bar 33 piercing the fixed member 52 removes from the fixed member 51, and locking of the UD bending operation knob 21 is released. At this time, the lock button 31 and the two lock bars 33 of the turn locking mechanism 30 move in an arrow FR direction in an outer periphery direction of the UD bending operation knob 21 by a biasing force of the coil spring 35. Thereby, the UD bending operation knob 21 is brought into a state in which the UD bending operation knob 21 can perform a free turning operation without being fixed by the turn locking mechanism 30.

By the above explanation, the endoscope 1 of the present modification can more reliably lock the turning position of the UD bending operation knob 21, in addition to the aforementioned operational effects, because the fixed member 52 is provided at the rigid frame body 53, and can be enhanced in rigidity more than the fixed member 51 of the aforementioned embodiment.

(Second Modification)

A present modification is another aspect of the lock bar and the fixed member of the turn locking mechanism 30. Therefore, for the components already described in the above, the same reference signs are used, and detailed explanation of the components is omitted.

Figure 15:
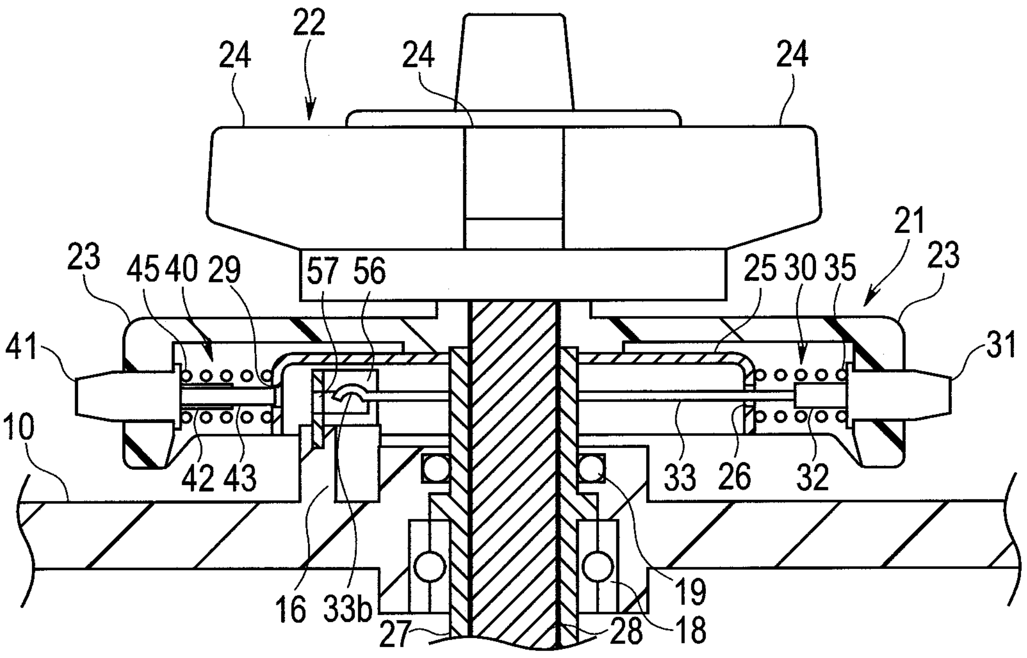
FIG. 15 is a partial cross-sectional view showing an operation portion body at which a bending operation knob of a second modification is provided.
Figure 16:
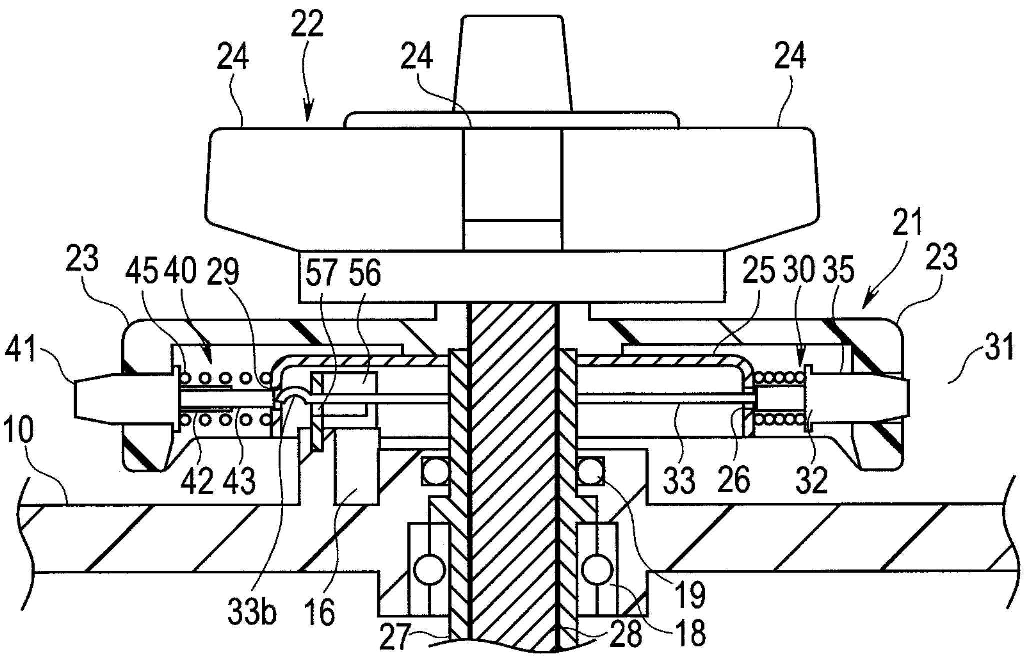

In an endoscope 1 of the present modification, a distal end of the lock bar includes an arc-shaped bent portion 33*b* in seen toward the paper surface of the drawings is provided at an extension end of a lock bar 33 of a turn locking mechanism 30 instead of the pointed end portion 33*a*, as shown in FIG. 15 and FIG. 16. The bent portion 33*b* is configured to hook on the fixed member 56. Further, instead of the fixed member 51 of an elastic body provided on the seat 16, a rigid fixed member 56 in an arc plate shape of metal, resin or the like is provided.

Figure 17:
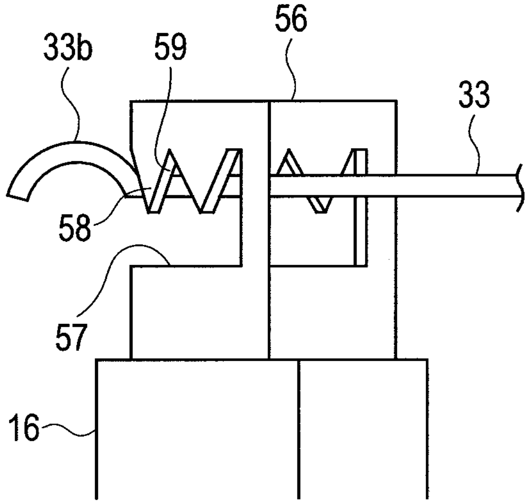
FIG. 17 is a side view showing a state in which a bent portion of a lock bar is caught by a fixed member of the second modification.

The lock bar 33 here is a metal rod body that is formed of an elastic body such as a leaf spring and has flexibility. As shown in FIG. 17, the bent portion 33*b* that is configured to get caught on the fixed member 56 and is prevented from slipping off is formed at the extension end of the lock bar 33.

Figure 18:
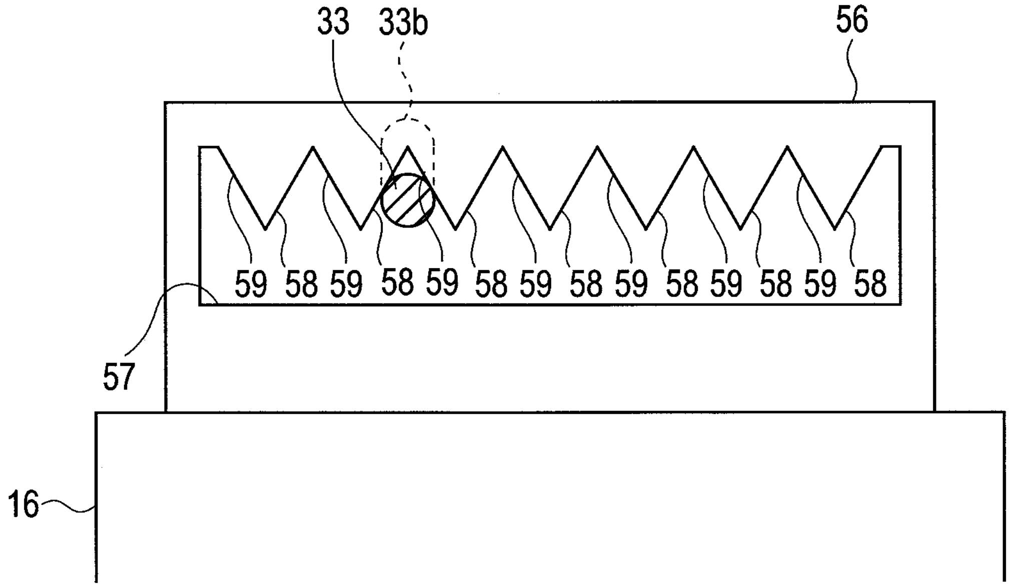
FIG. 18 is a plane development view showing a state in which the bent portion of the lock bar is caught by the fixed member of the second modification.

In the fixed member 56, an opening portion 57 is formed as shown in FIG. 17 and FIG. 18. In the fixed member 56 here, triangular protruded portions 58 and recessed portions 59 are formed in a row on one side of the opening portion 57 at an upper part seen toward the paper surface of the drawing in a turning direction of the UD bending operation knob 21. The opening portion 57 extends from an inner surface of the fixed member 56 to an outer surface of the fixed member 56. The opening includes an edge portion that extends in a first direction, the first direction corresponding to a rotation direction of the bending operation knob 21. The edge portion includes the protruded portion 57 and the recessed portion 59, and when the lock button 31 is in the second position and the lock bar 33 engages the fixed member 56, the lock bar 33 is located in the recessed portion 59. The edge portion includes a plurality of protruded portions 57 and a plurality of recessed portions 59 arranged alternately in the first direction. The lock bar 33 can be an elastic material.

In the turn locking mechanism 30 of the present modification configured like this, the turning position of the UD bending operation knob 21 can also be locked (fixed) by pushing in the lock button 31 of the turn locking mechanism 30. Locking of the turning position of the UD bending operation knob 21 can be released by pushing in the release button 41 of the lock release mechanism 40.

More specifically, when the lock bar 33 moves by the user pushing in the lock button 31 of the turn locking mechanism 30, and the bent portion 33*b* abuts on the fixed member 56, the lock bar 33 flexes, and the bent portion 33*b* crosses the opening portion 57 of the fixed member 56.

Subsequently, the lock bar 33 is fitted into the recessed portion 59, as shown in FIG. 16 to FIG. 18. In other words, the lock bar 33 is penetrated through the fixed member 56.

At this time, the lock bar 33 tries to return to its pre-penetration form by an elastic force, and the bent portion 33*b* abuts and gets caught on a wall portion beyond the fixed member 56.

Subsequently, the lock bar 33 abuts on a wall surface formed by the protruded portions 58 and the recessed portions 59 of the fixed member 56 to a direction in which the UD bending operation knob 21 turns, and therefore, the turning position of the UD bending operation knob 21 is locked. Thereby, the turning position of the UD bending operation knob 21 is locked.

Figure 19:
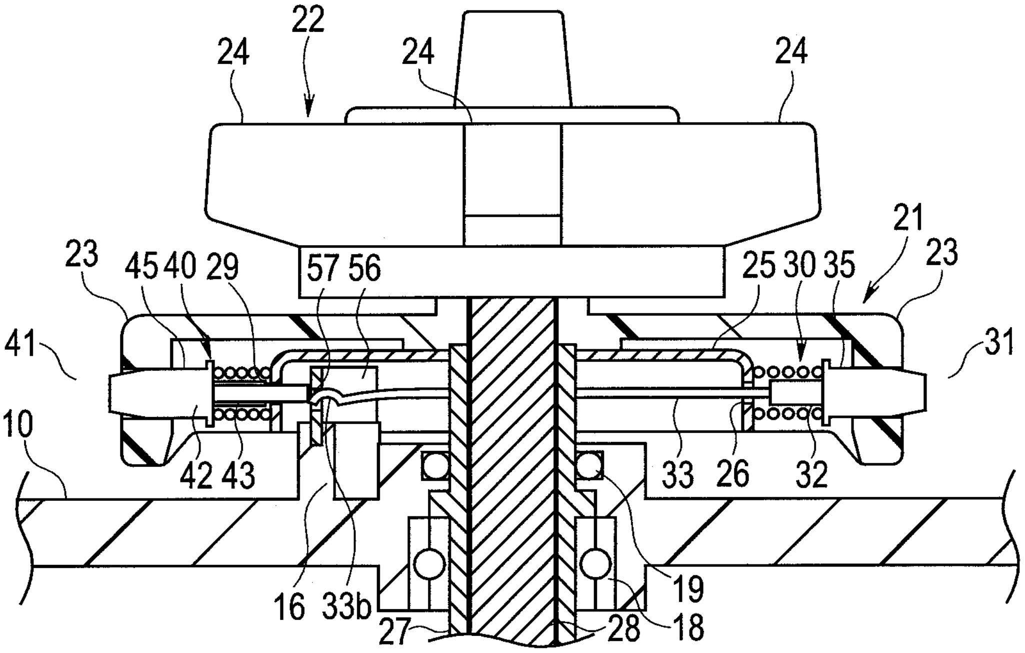
FIG. 19 is a partial cross-sectional view showing the operation portion body at which the bending operation knob in a state in which a release button of a lock release mechanism is pushed in of the second modification.
Figure 20:
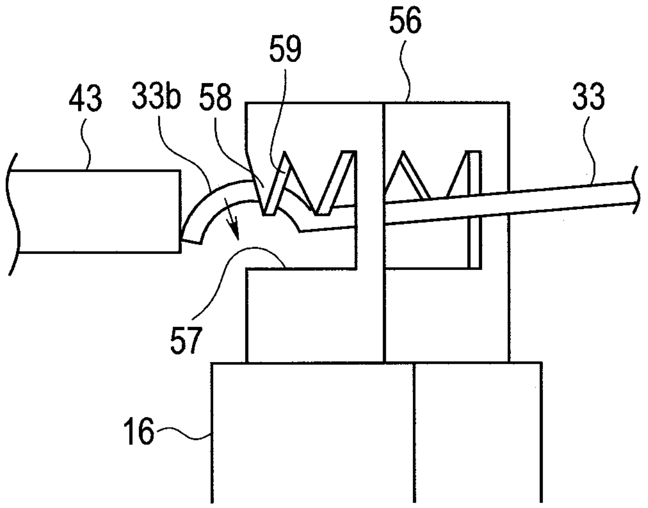
FIG. 20 is a side view showing a state in which the bent portion of the lock bar of the second modification is released from the fixed member by a release bar.
Figure 21:
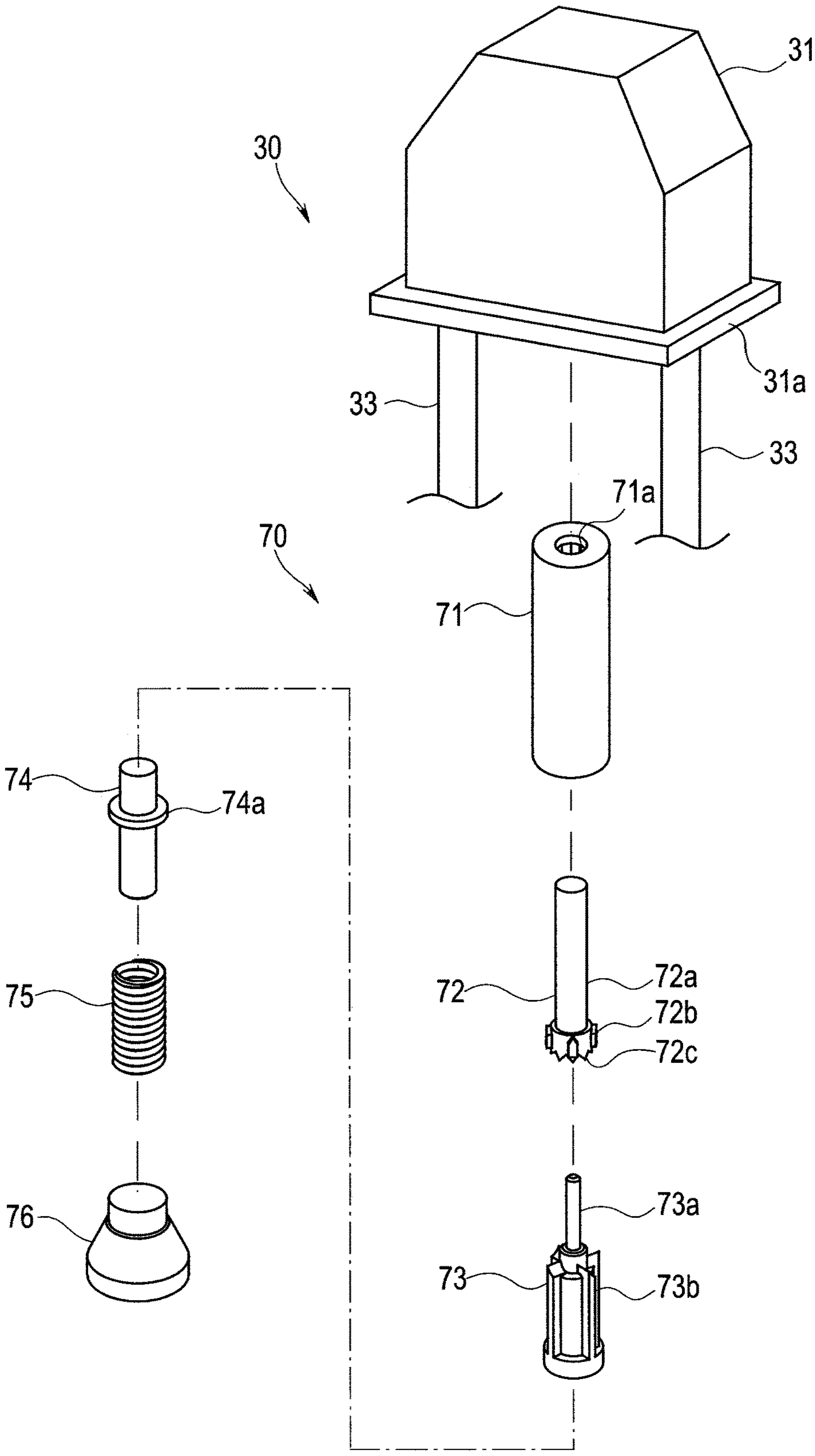
FIG. 21 is a schematic view showing a lock release mechanism adopting a knock type of a third modification.

When the user desires to release fixation of the turning position of the UD bending operation knob 21, the user pushes in the release button 41 of the lock release mechanism 40 as shown in FIG. 19 and FIG. 20.

Then, two release bars 43 provided to extend from the release button 41 are inserted through the respective hole portions 29 of an annular member 25, and extension ends abut on the bent portions 33*b* of the two lock bars 33. At this time, the two lock bars 33 deform downward as seen toward the paper surface of the drawing, and the bent portions 33*b* move downward, whereby the abutment on the fixed member 56 is released and the catch is released.

Thereby, in the lock bar 33, the bent portion 33*b* removes from the fixed member 56, and locking of the UD bending operation knob 21 is released. At this time, the lock button 31 and the two lock bars 33 of the turn locking mechanism 30 also move in an outer periphery direction of the UD bending operation knob 21 by a biasing force of a coil spring 35. Thereby, the UD bending operation knob 21 is brought into a state in which the UD bending operation knob 21 can perform a free turning operation without being fixed by the turn locking mechanism 30.

From the above explanation, the configuration of the present modification is suitable for the reusable endoscope 1 because the fixed member 56 has durability, in addition to the aforementioned operational effects.

(Third Modification)

A present modification is configured to adopt a so-called knock type extension lock mechanism 70 in a turn locking mechanism 30.

More specifically, the turn locking mechanism 30 has the knock type extension lock mechanism 70 besides the aforementioned lock button 31 and the like. The knock type extension lock mechanism 70 is configured by having a cylindrical exterior portion 71, a knock rod 72, a rotator 73, a spring retainer 74 in a circular column shape, a coil spring 75, and a bearing 76.

The exterior portion 71 has an opening portion 71*a* at one end, and has grooves not illustrated formed on an inner peripheral surface. The knock rod 72 is accommodated in the exterior portion 71 so that a rod-shaped operation rod body 72*a* protrudes from the opening portion 71*a* of the exterior portion 71. The knock rod 72 is operated so as to protrude and retract with respect to the exterior portion 71.

The knock rod 72 has a plurality of projection portions 72*b* that rectilinearly move along the grooves (not illustrated) of the exterior portion 71, on an outer peripheral portion, and a recessed and protruded portion 72*c* is formed on a surface on an opposite side to the operation rod body 72*a*. Note that the knock rod 72 is connected to an end surface of the lock button 31 by, for example, being screwed into the end surface.

The rotator 73 has a rod body 73*a* that is inserted into the knock rod 72 to be turnably held. On an outer peripheral portion of the rotator 73, cams 73*b* for abutting on the recessed and protruded portion 72*c* to rotate in response to protrusion and retraction of the knock rod 72 are formed. In other words, the cams 73*b* abut on the recessed and protruded portion 72*c* of the knock rod 72 and the rotator 73 is rotated around an axis.

In the spring retainer 74, an outward flange 74*a* is formed in a middle of an outer peripheral portion. The outward flange 74*a* abuts on one end of the coil spring 75, and receives a biasing force to one side. Note that the bearing 76 is connected to the opening portion of the exterior portion 71 by, for example, being screwed into the opening portion.

In other words, an operation shaft here is configured by the knock rod 72 that protrudes from the exterior portion 71 and is connected to the lock button 31 to the bearing 76 that closes the opening portion of the exterior portion 71.

Figure 22:
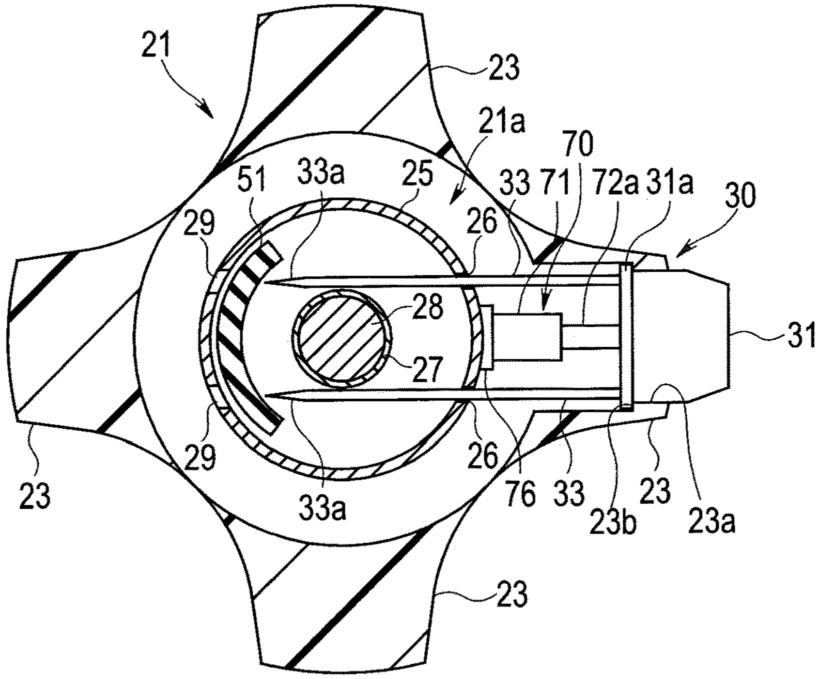
FIG. 22 is a cross-sectional view showing a configuration of a UD bending operation knob in which a turning lock mechanism of the third modification and a lock release mechanism are provided.
Figure 23:
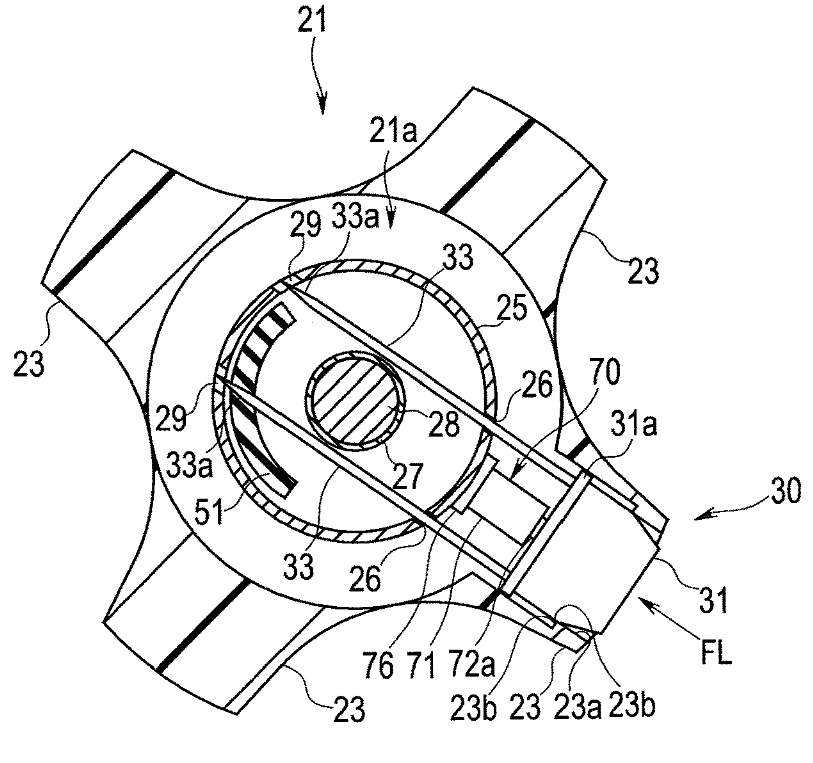

In the turn locking mechanism 30 having the knock type extension lock mechanism 70 configured like this, the knock rod 72 of the knock type extension lock mechanism 70 is pressed down when the lock button 31 is pushed in by the user, the rotator 73 turns in a predetermined direction, and the cam 73*b* gets caught on the protruded portion having a V-shaped end surface not illustrated and formed on the inner surface of the exterior portion 71 according to a turning position of the rotator 73, as shown in a state in FIG. 22 and a state in FIG. 23.

At this time, the knock type extension lock mechanism 70 is stopped in a state in which the rotator 73 presses the spring retainer 74 and compresses the coil spring 75. Thereby, the lock button 31 is brought into a state in which a part of the knock rod 72 is buried with respect to the exterior portion 71, and a state in which the lock button 31 is pushed in is held. The coil spring 75 generates a biasing force to bias the lock bar 33 in a radially outward direction, and the lock bar 33 engages the fixed member (51, 52, 56) with a friction force, and the friction force is larger than the biasing force.

Thereby, the lock bar 33 is fixed to fixed members (51, 52, 56) of the aforementioned embodiment and modifications by penetrating through the fixed members, or the like, and thereby the turning position of the UD bending operation knob 21 is brought into a locked state (see FIG. 23).

When the lock button 31 is pushed in again by the user from the state in which a part of the knock rod 72 is buried with respect to the exterior portion 71, in the turn locking mechanism 30, the rotator 73 of the knock type extension lock mechanism 70 further turns in a predetermined direction, and the cam 73*b* removes from the V-shaped end surface (not illustrated) formed on the protruded portion of the exterior portion 71.

At this time, the knock type extension lock mechanism 70 is brought into a state in which the rotator 73 receives the biasing force of the coil spring 75 via the spring retainer 74 and is returned and the knock rod 72 is protruded with respect to the exterior portion 71. Thereby, the lock button 31 returns to an initial state shown in FIG. 22, fixation of the lock bar 33 by the fixed members (51, 52, 56) of the aforementioned embodiment and modifications is released, and the UD bending operation knob 21 is brought into a state in which the UD bending operation knob 21 can perform a free turning operation without being fixed by the turn locking mechanism 30.

In this way, the endoscope 1 does not have to be provided with the lock release mechanism 40 in the UD bending operation knob 21, by adopting the so-called knock type extension lock mechanism 70 in the turn locking mechanism 30.

(Fourth Modification)

A present modification is another aspect of the fixed member of the turn locking mechanism 30. Therefore, for the components already described in the above, the same reference signs are used, and detailed explanation of the components is omitted.

Figure 24:
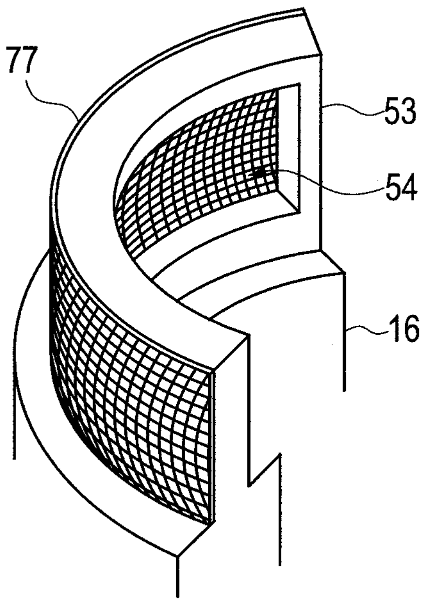
FIG. 24 is a perspective view partially showing a configuration of a fixed member of a fourth modification.

In an endoscope 1 of the present example, a rigid arc-shaped frame body 53 of metal, resin or the like is provided on a seat 16 formed to project on an outer surface side of an operation portion body 10, similarly to the first modification, as shown in FIG. 24. In the frame body 53, an opening portion 54 is formed. A mesh-like fixed member 77 is provided to close the opening portion 54 of the frame body 53. The fixed member 77 includes a surface provided in a direction different from a rotation direction of the bending operation knob 21, and the lock bar 33 engages the fixed member 77 by the lock bar 33 hooking on the surface.

The fixed member 77 is a wire net formed of metal, or a sheet-shaped mesh-like plate body formed of an elastic member such as rubber or a synthetic resin. The mesh-like fixed member 77 and the rigid frame body 53 are included in a turn locking mechanism 30. When the lock button 31 is in the second position and the lock bar 33 engages the fixed member 77, the pointed end portion 33*a* pierces a mesh of a surface of the wire net.

In the endoscope 1, a lock button 31 of the turn locking mechanism 30 is pushed in, whereby a lock bar 33 moves forward, a pointed end portion 33*a* pierces a mesh of the fixed member 77, and a UD bending operation knob 21 is locked. On the other hand, in the endoscope 1, a release button 41 of a lock release mechanism 40 provided at an opposite side of a finger rest portion 23 is pushed in, whereby the lock bar 33 retracts, the pointed end portion 33*a* removes from the mesh of the fixed member 77, and fixation of a turning position of the UD bending operation knob 21 is released.

With the configuration of the fixed member 77 like this, the endoscope 1 of the present modification can also lock and release the turning position of the UD bending operation knob 21.

(Fifth Modification)

A present modification is another aspect of the fixed member and the lock bar 33 of the turn locking mechanism 30. Therefore, for the components already described in the above, the same reference signs are used, and detailed explanation of the components is omitted.

Figure 25:
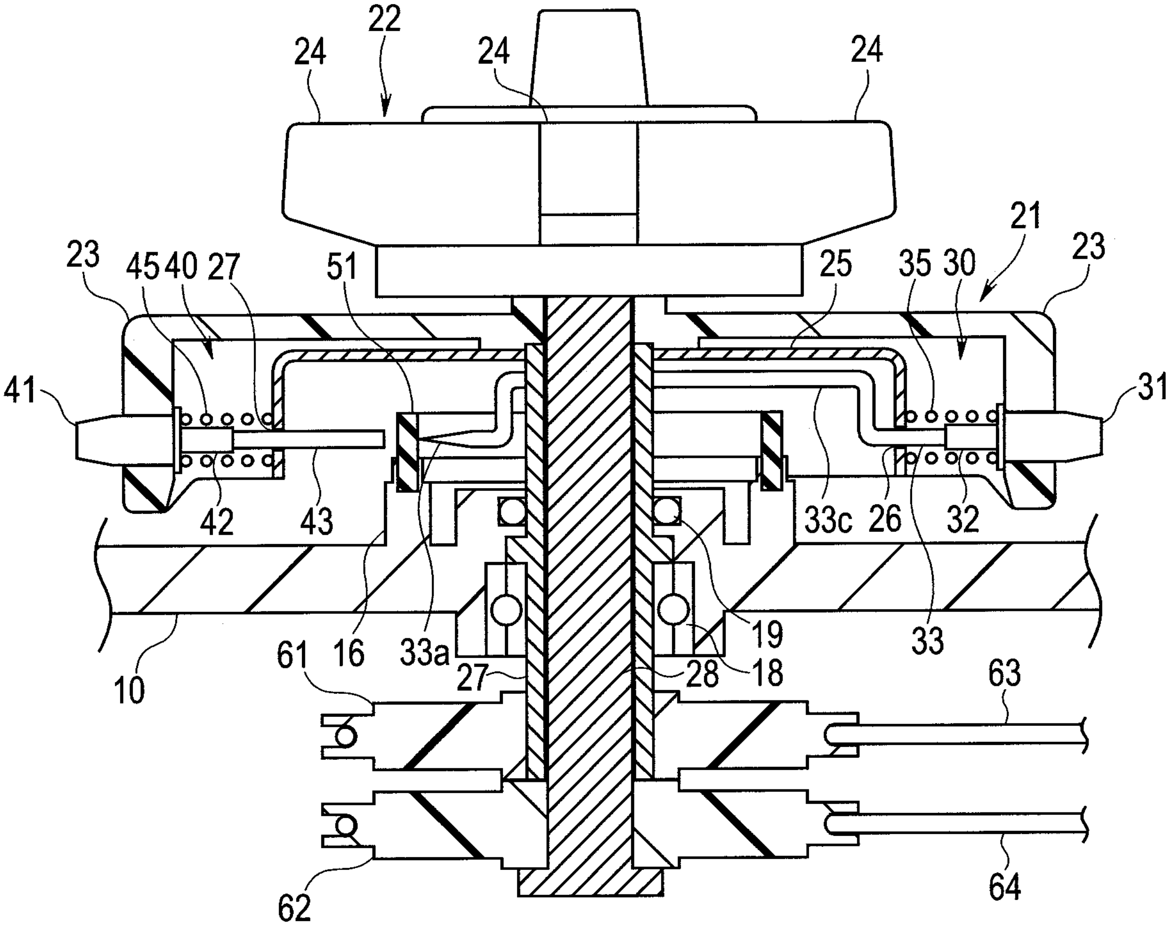
FIG. 25 is a partial cross-sectional view showing a configuration of an operation portion body at which a bending operation knob of a fifth modification is provided.
Figure 26:
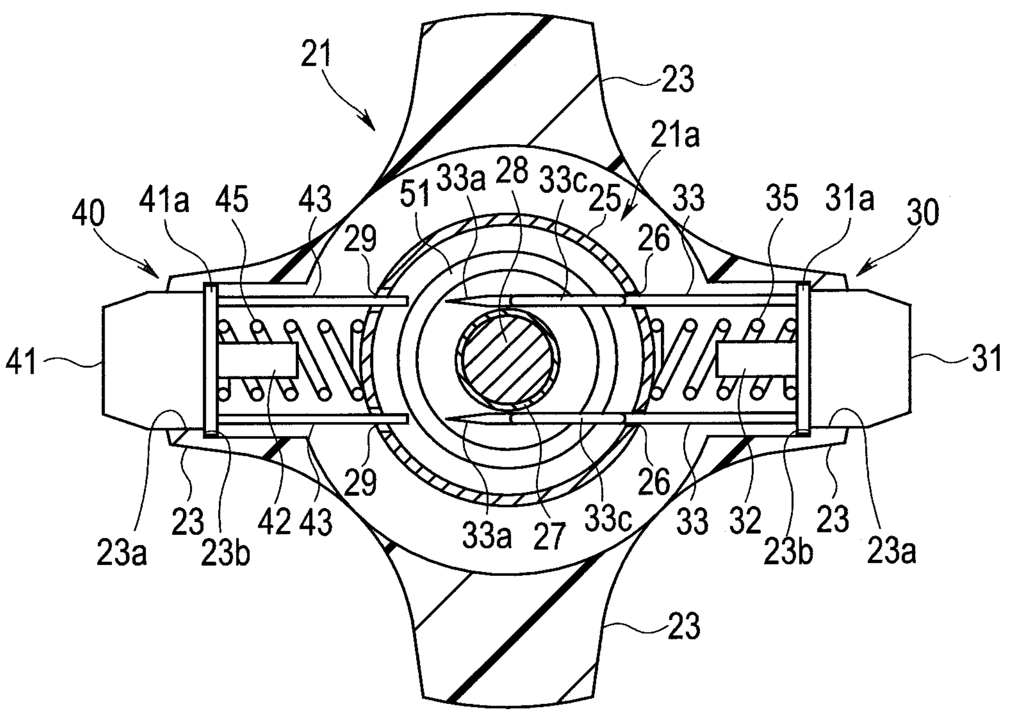
FIG. 26 is a cross-sectional view showing a configuration of a UD bending operation knob in which a turning lock mechanism of the fifth modification and a lock release mechanism are provided.
Figure 27:
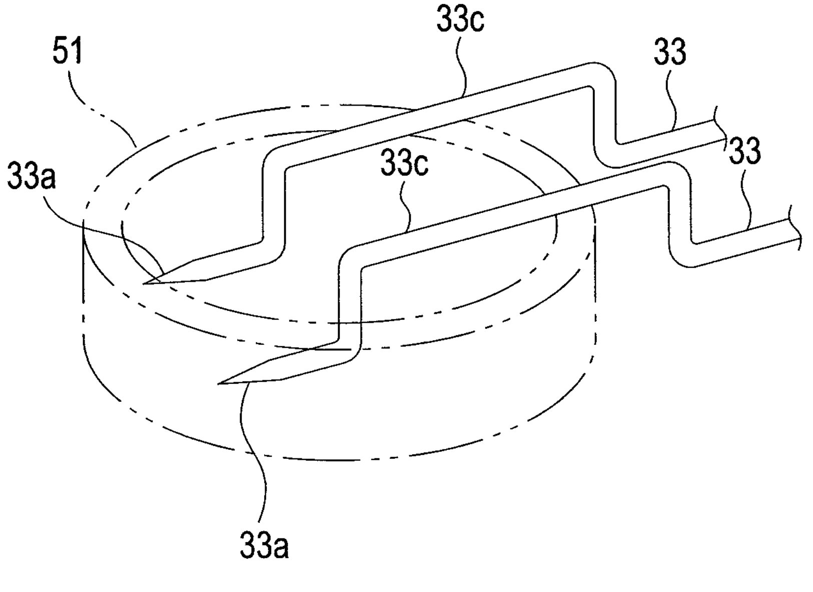
FIG. 27 is a perspective view partially showing configurations of a fixed member and a lock bar of the fifth modification.

In an endoscope 1 of the present example, a turn locking mechanism 30 is configured to have an annular fixed member 51, and a crank-shaped lock bar 33, as shown in FIG. 25 to FIG. 27. The lock bar 33 is in a shape having a middle portion 33*c* in a U-shape that is folded upward seen toward the paper surface of the drawing and folded downward to a pointed end portion 33*a* side here so as not to interfere with the annular fixed member 51.

In other words, by the middle portion 33*c*, the lock bar 33 is disposed above the fixed member 51, and can avoid interference with the fixed member 51 at a time of moving.

According to the configuration like this, in the endoscope 1, it is possible to increase a turning operation angle of the UD bending operation knob 21 by making the fixed member 51 annular so that the lock bar 33 of the turn locking mechanism 30 does not interfere with the fixed member 51.

Note that an active member of the endoscope 1 is not only the bending portion 7, but the turn locking mechanism 30 and the lock release mechanism 40 may be provided at other endoscope functions than the bending portion 7, for example, an operation knob that operates, and raises and lowers a treatment instrument raising base (forceps elevator) used in, for example, a side-viewing endoscope.

The disclosure described in the above embodiment and modifications is not limited to the embodiment and the modifications, but other than the embodiments and modifications, various modifications can be carried out within the range without departing from the gist of the disclosure in the implementation stage. Furthermore, in the above embodiment and modifications, the disclosures in the various stages are included, and various inventions can be extracted by appropriate combinations in the plurality of components that are disclosed.

For example, even if some components are deleted from all the components shown in the embodiment and modifications, the configuration from which the components are deleted can be extracted as the invention if the problem mentioned can be solved, and the effects mentioned are obtained.

(Example 1) An endoscope comprising:
- an insertion portion;
- an operation portion body provided connectively to the insertion portion;
- a knob provided at the operation portion body by being axially supported by a rotation shaft, and configured to be operated to turn when operating an active member; and
- a turning lock mechanism provided in the knob and configured to lock turning of the knob,
- wherein the turning lock mechanism comprises
- a lock button,
- a lock bar connected to the lock button and extensively provided inside of the knob, and
- a fixed member fixed to the operation portion body, and configured to be penetrated by the lock bar when the lock button is pushed in, so that turning of the knob is locked.

(Example 2) The endoscope according to Example 1,
- wherein the lock bar comprises two lock bars, with the rotation shaft being interposed between the two lock bars, and
- at least one of the two lock bars penetrates through the fixed member, so that turning of the knob is locked.

(Example 3) The endoscope according to Example 1,
- wherein the lock bar includes a sharp pointed end portion at an extension end.

(Example 4) The endoscope according to Example 3,
- wherein the fixed member includes an elastic body which the pointed end portion can pierce.

(Example 5) The endoscope according to Example 3,
- wherein the fixed member includes
- a frame body including an opening portion, and
- a sheet of an elastic body that is provided to close the opening portion, and can be pierced by the pointed end portion.

(Example 6) The endoscope according to Example 1, wherein the fixed member includes a plurality of protruded portions and recessed portions in a direction in which the knob turns, on one side of an opening portion, and the lock bar is fitted in at least one of the recessed portions, so that the knob is locked.

(Example 7) The endoscope according to Example 6, wherein the lock bar is an elastic body.

(Example 8) The endoscope according to Example 6, wherein the lock bar includes a bent portion configured to abut and get caught on the fixed member, at an extension end.

(Example 9) The endoscope according to Example 1, comprising:

a lock release mechanism provided in the knob and configured to release locking of the knob, wherein the lock release mechanism comprises a release button provided at a symmetrical position of the lock button, and a release bar connected to the release button, in which an end portion extensively provided inside of the knob is provided at a position facing an extension end of the lock bar.

(Example 10) The endoscope according to Example 1, wherein the fixed member includes an abutment surface provided in a direction different from a direction in which the knob turns, and the lock bar abuts on the abutment surface, so that turning of the knob is locked.

(Example 11) A method for locking a knob of an endoscope, the endoscope comprising an insertion portion, an operation portion body provided connectively to the insertion portion, a knob provided at the operation portion body by being axially supported by a rotation shaft, and configured to be operated to turn when operating an active member, a lock button provided at the knob and configured to lock turning of the knob, a lock bar connected to the lock button and extensively provided inside of the knob, and a fixed member fixed to the operation portion body, the method comprising:

pushing in the lock button; and causing the lock bar to penetrate through the fixed member, so that turning of the knob is locked.

(Example 12) The method for locking the knob according to Example 11, wherein the fixed member includes an abutment surface provided in a direction different from a direction in which the knob turns, and the lock bar abuts on the abutment surface, so that turning of the knob is locked.

What is claimed is:

1. An operation portion for use with an endoscope, comprising:

a knob configured to rotate around a rotation shaft;

a lock button provided at the knob, the lock button configured to translate between a first position and a second position;

a first lock bar extending from an inside surface of the lock button;

a second lock bar extending from the inside surface of the lock button; and a fixed wall provided in the knob, wherein the first lock bar is separated from the second lock bar with the rotation shaft interposed therebetween, wherein, when the lock button is in the second position, at least one of the first lock bar and the second lock bar penetrates completely through the fixed wall to prevent the knob from rotating around the rotation shaft, and wherein, in a view along the rotation shaft, the lock button is located on an opposite side of the rotation shaft from the fixed wall.

2. The operation portion according to claim 1, wherein the fixed wall includes an elastic material, and wherein, when the lock button is in the second position, the at least one of the first lock bar and the second lock bar penetrating completely through the fixed wall includes a distal end of the at least one of the first lock bar and the second lock bar piercing a surface of the elastic material.

3. The operation portion according to claim 2, wherein the fixed wall includes an opening portion, and wherein the elastic material covers the opening portion.

4. The operation portion according to claim 1, wherein the fixed wall includes a wire net formed of metal, and wherein, when the lock button is in the second position, the at least one of the first lock bar and the second lock bar penetrating completely through the fixed wall includes a distal end of the at least one of the first lock bar and the second lock bar piercing a mesh of a surface of the wire net.

5. The operation portion according to claim 1, wherein (i) a distal end of the at least one of the first lock bar and the second lock bar includes a bent portion configured to hook on the fixed wall or (ii) the at least one of the first lock bar and the second lock bar is an elastic material or both (i) and (ii).

6. The operation portion according to claim 1, further comprising:

a release button provided at the knob, the release button configured to translate between a third position and a fourth position, and a release bar extending from an inside surface of the release button and configured to release the at least one of the first lock bar and the second lock bar from the fixed wall.

7. The operation portion according to claim 6, wherein the first lock bar extends along a first axis, wherein the release bar extends along a second axis, and wherein the first axis and the second axis are coaxial.

8. The operation portion according to claim 7, wherein the first axis and the second axis are oriented 90 degrees relative to the rotation shaft.

9. The operation portion according to claim 1, further comprising a biasing element generating a biasing force to bias the at least one of the first lock bar and the second lock bar in a radially outward direction such that the at least one of the first lock bar and the second lock bar is in the first position.

10. The operation portion according to claim 9, wherein the lock bar engages the fixed wall with a friction force, and wherein the friction force is larger than the biasing force.

11. The operation portion according to claim 1, wherein the fixed wall extends 90° in a circumferential direction of the rotation shaft.

12. The operation portion according to claim 1, wherein the endoscope is a single-use endoscope.

13. The operation portion according to claim 1, further comprising:

an operation portion body;

an insertion portion provided distally relative to the operation portion body;

a turn locking mechanism provided in the knob, the turn locking mechanism comprising the lock button and the lock bar; and a lock release mechanism provided in the knob, the lock release mechanism comprising a release button and a release bar.

14. The operation portion according to claim 1, wherein the lock button is configured to translate between the first position and the second position in a radial direction relative to the rotation shaft.

15. The operation portion according to claim 1, wherein, in a longitudinal direction relative to the rotation shaft, a longitudinal position of the fixed wall relative to the rotation shaft is maintained during translation of the lock button between the first position and the second position.

16. The operation portion according to claim 1, wherein the lock button is configured to translate between the first position and the second position along a translation axis, and wherein the translation axis is oriented 90 degrees relative to the rotation shaft.

17. A method for locking the operation portion according to claim 1, the method comprising:

translating the lock button from the fist position to the second position; and penetrating at least one of the first lock bar and the second lock bar completely through the fixed wall to prevent the knob from rotating around the rotation shaft.

18. The method according to claim 17, wherein the fixed wall includes a surface provided in a direction different from a rotation direction of the knob.

19. An operation portion for use with an endoscope, comprising:

a knob configured to rotate around a rotation shaft;

a lock button provided at the knob, the lock button configured to translate between a first position and a second position;

a lock bar extending from an inside surface of the lock button, a fixed wall provided in the knob;

a release button provided at the knob; and a release bar extending from an inside surface of the release button, wherein, when the lock button is in the second position, the lock bar engages the fixed wall to prevent the knob from rotating around the rotation shaft, wherein, in a view along the rotation shaft, the lock button is located on an opposite side of the rotation shaft from the fixed wall, wherein the release button is configured to translate between a third position and a fourth position, wherein the release bar is configured to release the lock bar from the fixed wall, and wherein the lock bar extends along a first axis, the release bar extends along a second axis, and the first axis and the second axis are coaxial.

* * * * *